March 20, 1956
G. A. TOMIK ET AL
2,738,847
OVERLOAD RELEASE FOR IMPLEMENT WITH
DISCONNECTION OF TRACTOR CLUTCH
Filed Nov. 14, 1952
3 Sheets-Sheet 1
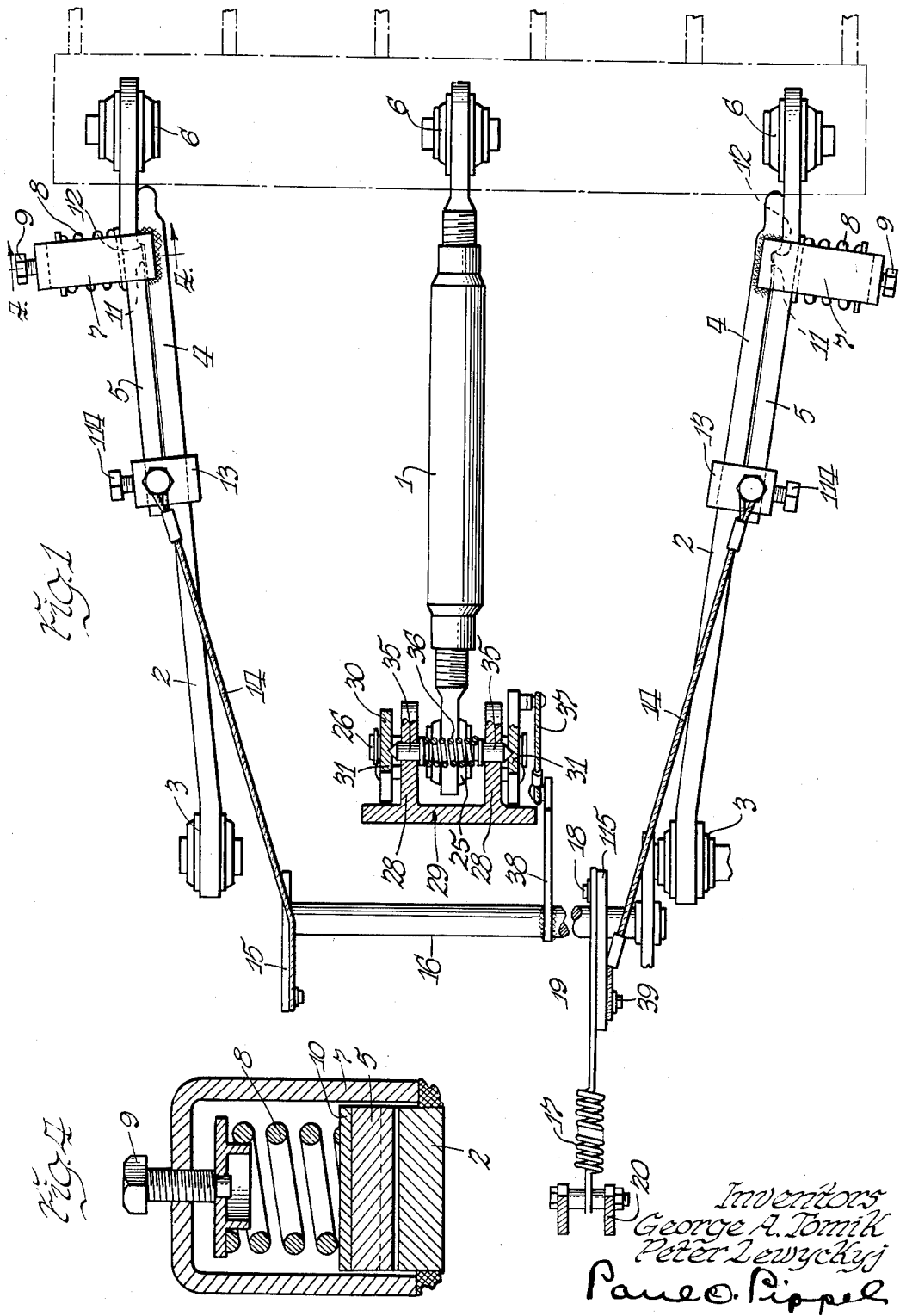
Inventors
George A. Tomik
Peter Lewyckyj
Paul C. Pippel
Atty.

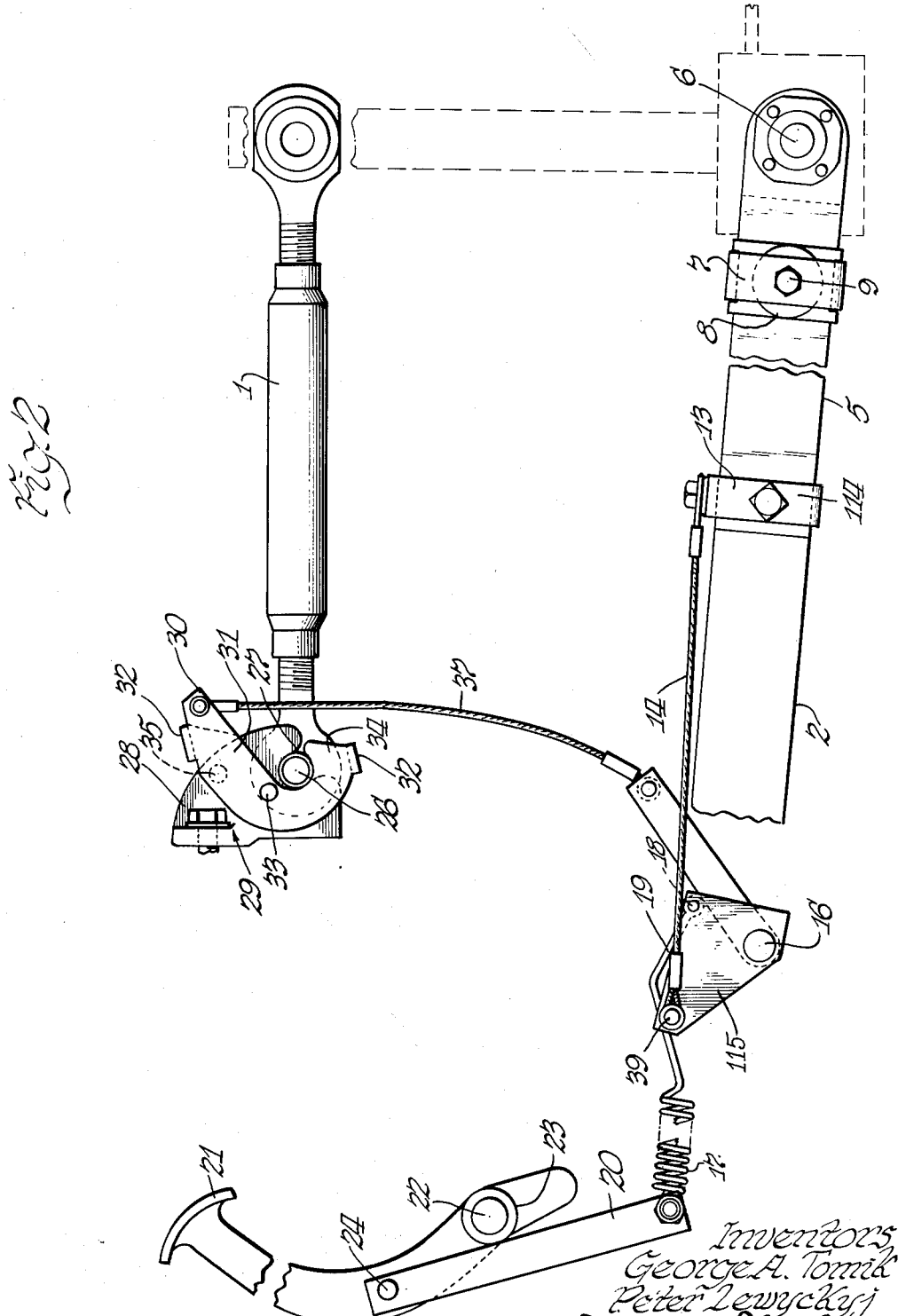

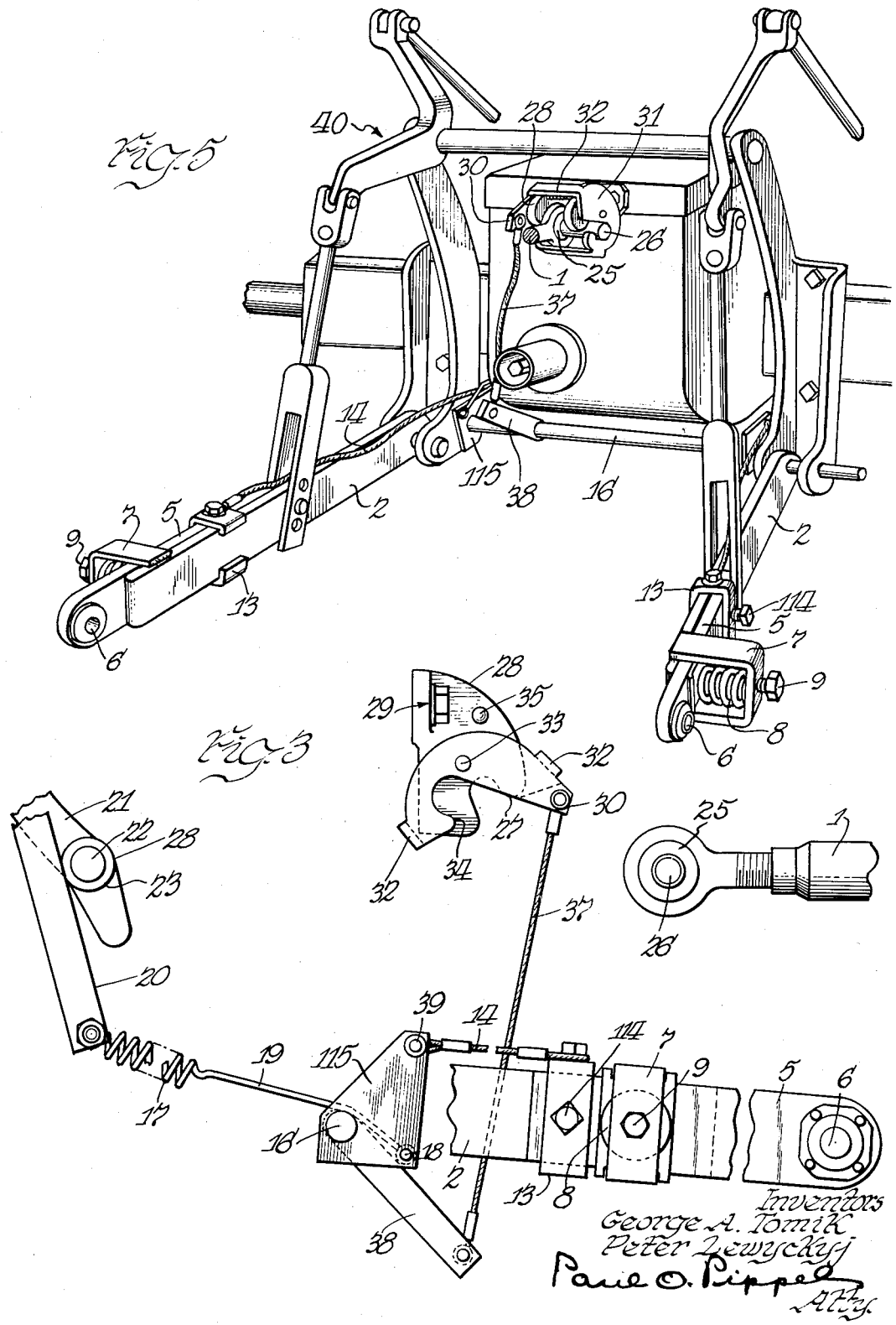

United States Patent Office 2,738,847
Patented Mar. 20, 1956

2,738,847

OVERLOAD RELEASE FOR IMPLEMENT WITH DISCONNECTION OF TRACTOR CLUTCH

George A. Tomik, Doncaster, and Peter Lewyckyj, Norton, near Doncaster, England, assignors to International Harvester Company, a corporation of New Jersey Application November 14, 1952, Serial No. 320,464

7 Claims. (Cl. 180—14.5)

This invention relates to linkage for connecting agricultural implements to tractors, and is particularly concerned with improvements in three-point linkages of this kind comprising an upper link and two lower links spaced apart, whereby the implement may be readily raised and supported in a transport position or lowered to working position by hydraulic or other mechanical means connected to the linkage.

Linkages of the kind referred to are convenient and effective in use, but have the disadvantage that the connection of the implement to the tractor is unyielding and consequently, if the implement encounters an obstruction, damage is likely to result.

The present invention has for its object to provide an improved linkage whereby the disadvantage referred to may be obviated in a simple and effective manner.

According to the present invention, in a three-point linkage of the kind referred to, the lower links are provided with members rearwardly displaceable or slidable in relation to said links and adapted for connection to the implement, the said members being held against displacement by means releasable on application of excessive load, and control means is actuated by rearward displacement of one or both of the said members for disconnecting the driving mechanism of the tractor. Conveniently, the control means is adapted to act on a clutch in the driving mechanism.

The term "excessive load" used herein means a draft load in excess of the maximum tractive effort required for operation of the implement.

It will be understood that as rearward displacement of the said members takes place, disengagement of the drive is automatically effected, the range of displacement of the said members being of such extent that under normal working conditions, particularly as regards tractor speed, the tractor will come to a standstill during sliding movement of said members relative to the links in one zone before said members reach the limit of their rearward displacement.

The said control means advantageously is adapted to permit re-engagement of the tractor-driving mechanism by an operator. In a preferred arrangement the said control means is connected to a clutch-operating member by means of a spring loaded to a tension exceeding the force required to effect disengagement of the clutch.

The releasable means normally holding the said members against displacement in relation to said links preferably is adapted for automatic re-engagement when the said members are returned to their initial position.

In some circumstances, however, for example, if the tractor is operating on a downhill gradient, forward movement of the tractor may not be arrested before the limit of rearward displacement of the said members is reached and, consequently, to safeguard against damage under such conditions, it is desirable that the linkage should permit of relative sliding movement and displacement of said members into another zone where there is complete separation of the implement from the tractor if, for any reason, the tractor fails to come to a standstill before the said members reach the rearward limit of their range of displacement.

According to a further feature of the invention, therefore, the connections between the implement and the lower links embody friction means adapted to transmit normal tractive force but to permit separation of the implement if the forward movement of the tractor has not been arrested when the said members have reached the limit of their rearward displacement, the connection of the upper link to the tractor embodying releasable retaining means controlled by movement of one or both of the said displaceable members so that the upper link is disconnected at or about or just before the displaceable members reach the rearward limit of their travel, means being provided for maintaining disengagement of the tractor drive if separation of the implement takes place. The means for maintaining disengagement of the tractor drive may comprise an over-centre link device which is manually releasable for re-establishing control of the tractor. The over-centre device may be associated with the said spring.

In a preferred embodiment, the rearwardly displaceable members are separable from the respective links, being normally retained by friction clamp devices through the intermediary of which the said displaceable members are connected to the means for disconnecting the driving mechanism of the tractor.

More specifically, the invention includes a linkage of the kind referred to for connecting an agricultural implement to a tractor, wherein each lower link is connected to the implement by means of a rearwardly and longitudinally displaceable member in slidable engagement with the link and normally retained against displacement by means of a releasable detent connection between the said members and the link which are pressed into engagement with one another by spring means, a clamp device frictionally engaging the forward end of the respective displaceable member, cables or the like connecting the said clamp devices to a cross-shaft, means for connecting the said cross-shaft to clutch-operating mechanism of the tractor, a releasable coupling device connecting the upper link to the tractor, and means operated from said cross-shaft for control of locking means for said releasable coupling, the arrangement being such that on rearward displacement of said displaceable members, the driving mechanism of the tractor is disengaged and so that, if the tractor fails to stop before the rearward limit of displacement of the said members is reached, the friction clamp devices disengage from said displaceable members and, just before such disengagement, the locking means for the coupling of the upper link is released.

The invention is hereinafter described, by way of example, with reference to the accompanying drawings, in which:

Fig. 1 is a part sectional plan view illustrating diagrammatically one embodiment of the improved three-point linkage in accordance with the invention, and indicating in dotted lines an implement carried thereby;

Fig. 2 is a side elevation corresponding generally to Fig. 1;

Fig. 3 is a view similar to Fig. 2 but showing the parts in the positions occupied when separation of the implement from the tractor takes place;

Fig. 4 is a section on the line IV—IV of Fig. 1, showing a preferred construction of the releasable coupling means; and Fig. 5 is a view in perspective of the rear end of a tractor incorporating a power plant and conventional drive transmission mechanism, and showing the attaching structure of this invention mounted thereon.

In carrying the invention into effect according to one embodiment, and with reference to the accompanying drawings, the improved three-point linkage according to the invention comprises an upper centrally disposed link 1 extending rearwardly from a point of connection to the tractor, and a pair of lower links 2 which at the forward ends are anchored to the tractor by ball and socket or other universal connections 3 and extend rearwardly, usually diverging from one another so that the rear ends 4 of the lower links are farther apart than the forward ends.

In accordance with the present invention, each of the lower links 2 is provided at its rear end with a rearwardly displaceable member 5 longitudinally slidable in relation to the link 2, said member 5 extending beyond the rear end of the link and being provided with a ball and socket or other coupling means 6 for connection to an implement. The said member 5 may be in the form of a flat, or substantially flat, bar disposed at the side of, and in slidable contact with, the respective face of the link 2 which also may be in the form of a flat bar. The displaceable member 5 extends through a guide 7 welded or otherwise fixed to the link 2 at its rear end and housing a strong spring 8 which advantageously is adjustable by a screw device 9 and acts through a plate 10 to press the said member 5 tightly against the link 2. A transverse recess 11 is provided in the face of the link 2 with which the said member 5 contacts, and the member 5 is provided with a detent 12 of corresponding form arranged so that under the pressure of the said spring 8 the displaceable member 5 will remain locked to the link 2 until excessive load is encountered, whereupon the detent 12 disengages from the recess 11 against the action of the spring 8 to permit of rearward displacement of the said member 5. The forward end of the said member 5 which is disposed at a suitable distance from the guide 7 is retained by a friction clamp device 13 which is slidable on the link 2 and is frictionally engaged with the said member 5 by means of a screw device 114. One slidable clamp device 13 is connected by means such as a flexible cable 14 to an arm 15 fixed to and projecting upwardly from a rockable cross-shaft 16 mounted on the tractor, and the other friction clamp device 13 is connected by a similar cable 14 to a lever plate 115 fixed on the cross-shaft 16. The lever plate 115 is connected by means of a tension spring 17 to a lever 20 pivoted at 24 to the clutch-operating pedal 21 and arranged to bear against a boss 23 on the pedal 21 surrounding the clutch-operating shaft 22. The spring 17 is connected to a pivot 18 on the lever plate 115 by means of a bent or cranked part 19, and the said pivot 18 and the point of connection 39 of the respective cable 14 are so arranged in relation to the axis of the cross-shaft 16 that if separation of the implement from the tractor should occur, movement of a friction clamp device 13 up to the guide 7 will cause the lever plate 115 to move into the position shown in Fig. 3, in which the pivot 18 passes into an over-centre position permitted by the bent or cranked formation 19. The bent or cranked formation 19 of the spring in conjunction with the lever plate 115 constitutes an over-centre link device.

An obstruction encountered by the implement will result in such increased pull or draft by the tractor on one or both of the displaceable members 5 that the detent 12 thereof will disengage and allow the member or members to be displaced rearwardly by the pull of the tractor. This displacement of one or both of the displaceable members 5 acts on the cross-shaft 16 and thence through the spring 17 on the clutch-operating pedal 21 so that during the rearward displacement of the member 5, the clutch is disengaged and the tractor generally comes to a standstill before the rearward limit of displacement of the said member or members 5 is reached. As the displaceable members 5 are linked to the cross-shaft 16, disengagement of the clutch will be effected by rearward displacement of one or both of the said members 5. To permit of re-engagement of the clutch for reversing the tractor, preparatory to clearing the obstruction, for instance, by lifting the implement by the hydraulic lift or for by-passing the obstruction, the clutch pedal is depressed fully if necessary to effect complete disengagement of the clutch, and after engagement of reverse gear, the clutch pedal 21 can be returned to its original position. On reversal of the tractor, the displaceable members 5 will be returned so that the detents 12 thereof automatically re-engage with the recesses 11 in the lower links 2. If the tractor should not come to rest before the displaceable members 5 reach the rearward limit of their travel, the clamp devices 13 frictionally engaged with the said members 5 will abut the guides 7 at the ends of the links 2 and thereby will be dislodged from the displaceable members 5 which can then pull clear of the links 2. If separation at the lower links 2 occurs in this manner, it is essential that the upper link 1 should be disconnected also. For this purpose the forward end of the upper link is releasably connected to the tractor by latching mechanism now to be described. The forward end of the upper link embodies a ball and socket connection 25 having a transverse pin forming trunnions 26 which engage in open slots 27 in parallel vertical walls 28 of a fitting 29 attached to the tractor. These slots 27 open in a downward direction at a suitable angle so that, even when the links are raised by hydraulic lift or other means to elevate the implement, the forward pressure on the trunnions 26 will not tend to dislodge them from the slots 27. When the implement is being elevated, the upper link 1 is placed in tension and, in order to retain the trunnions 26 in the slots 27, a pivoted keeper device 30 is provided comprising side plates 31 connected together with bridge pieces 32 and pivoted to the said fitting 29 by a pin 33 so that hook-shaped parts 34 of the plates 31 may be engaged beneath the trunnions 26, the keeper device 30 being maintained in the engaged position by means of detent plungers 35 pressed outwards by a spring 36, said plungers being mounted in the fitting 29 and engaging suitable recesses in the inner faces of the plates 31 of the keeper device 30. One plate 31 of the keeper device 30 extends upwardly and rearwardly for the connection of one end of a flexible cable 37, the other end of which is connected to a suitably disposed arm 38 on the said cross-shaft 16, there being a certain amount of slack in the cable 37, and the arrangement being such that before the clamp devices 13 frictionally engaging the displaceable members 5 abut the guides 7 on the lower links 2, the keeper device 30 will be turned about its pivot 33 so as to disengage the trunnions 26 of the upper link 1.

It should be understood that the attaching mechanism with which this invention is concerned is mounted upon a tractor indicated in Fig. 5. The tractor may be of any suitable type but is preferably provided with a power transmission mechanism utilizing a clutch and clutch-disengaging means such as the foot pedal 21, and having suitable lift mechanism thereon generally designated at 40 for raising and lowering the attaching mechanism. The position of the implement is indicated generally in dotted lines in Figs. 1 and 2.

It will be understood that when complete separation of the implement occurs in the manner described, the clutch, which has been disengaged by the action of the displaceable members 5 to bring the tractor to a standstill, would be re-engaged violently unless means for preventing such re-engagement were provided. Any possibility of such re-engagement is obviated by the over-centre link locking device comprising the bent or cranked part 19 of the spring 17 and the lever plate 115. As shown in Fig. 3, it will be seen that if complete separation of the implement from the tractor takes place, the lever plate 115 is turned to such a position, which may be determined by a stop (not shown), that the spring 17 is locked in the extended position, thus maintaining the clutch disengaged. When it is desired to re-engage the clutch, the clutch pedal is depressed by the foot to relieve the tension on the spring 17 and the cross-shaft 16 is turned back into its initial position conveniently by pulling on the cable 37 which operates the keeper device 30.

It will be understood that the invention is not limited to the particular embodiment hereinbefore described. For example, the rearwardly displaceable members and friction means may be otherwise constructed and arranged in any suitable manner. Thus, instead of the displaceable members being slidable in relation to the lower links, they may be of L formation and pivoted to upwardly extending parts at the rear ends of the lower links and normally held against displacement by any suitable spring detent arrangement. Furthermore, any other suitable construction of releasable coupling may be provided for the upper link, and the operating mechanism may be modified in various ways. Thus, the bent or cranked part 19 of the spring may be replaced by a separate suitably shaped link.

What is claimed is:

1. In mechanism for mounting an implement upon a tractor having driving mechanism incorporated therein and clutch operating means for disconnecting the drive, wherein said mounting mechanism includes an upper rearwardly extending link and laterally spaced lower links vertically spaced from said upper link and connecting the implement to the tractor: laterally spaced attaching members forming a part of said lower links and adapted for attachment to the implement, means for releasably connecting said members to the respective of said lower links in draft-receiving relation for rearward displacement relative thereto in response to excessive draft upon the implement, releasable latching means in one of the connections of said upper link, and means operatively connecting said attaching members to said latching means and operable after a predetermined rearward displacement of the attaching members relative to the lower links for releasing said latching means.

2. The invention set forth in claim 1, wherein the means for connecting the attaching members to the clutch operating means and the latching means for the upper link includes a rockable shaft mounted on the tractor, said shaft being rocked by rearward movement of the attaching members, and said shaft being operatively connected to the clutch operating means and said latching means.

3. In mechanism for mounting an implement upon a tractor having driving mechanism incorporated therein and clutch operating means for disconnecting the drive, wherein said mounting mechanism includes an upper link and laterally spaced lower links connecting the implement to the tractor: laterally spaced attaching members forming a part of said lower links and adapted for attachment to the implement, means releasably connecting said members to the respective of said lower links in draft-receiving relation for rearward displacement relative thereto in response to excessive draft upon the implement, and means operatively connecting said attaching members to the clutch operating means on the tractor for disconnecting the tractor drive mechanism upon said rearward displacement of the attaching members relative to the links, and an over-center locking mechanism incorporated in the means for connecting the implement attaching members to the clutch operating means effective to maintain the tractor drive mechanism disconnected upon separation of said attaching members from said lower links.

4. In mechanism for mounting an implement upon a tractor having driving mechanism incorporated therein and clutch operating means for disconnecting the drive, wherein said mounting mechanism includes an upper link and laterally spaced lower links connecting the implement to the tractor: laterally spaced attaching members forming a part of said lower links and adapted for attachment to the implement, and means releasably connecting said members to the respective of said lower links in draft-receiving relation for rearward displacement relative thereto in response to excessive draft upon the implement, said releasably connecting means comprising spring pressed detents releasable in response to excessive draft on the implement and friction clamp means releasable after a predetermined rearward movement of said attaching members relative to said lower links.

5. The invention set forth in claim 4, wherein the implement attaching members are releasably secured to the respective lower links by friction clamp means carried by the attaching members, and at a rearwardly spaced location by spring pressed detents, and wherein an abutment is provided on the lower link engageable with said friction clamp means after a predetermined rearward displacement of the attaching members to accommodate separation of said members from their associated clamps.

6. In mechanism for mounting an implement upon a tractor having driving mechanism incorporated therein and clutch operating means for disconnecting the drive, wherein said mounting mechanism includes an upper link and laterally spaced lower links connecting the implement to the tractor: laterally spaced attaching members forming a part of said lower links and longitudinally slidable relative thereto, means holding said attaching members against rearward movement relative to said links in normal operation of the implement, said holding means being releasable under overload to accommodate sliding movement of said attaching members in a first zone while maintaining the connection thereof with said links, an operating connection between said members and the tractor clutch operating means effective during movement of said members in said zone to activate said clutch operating means to disconnect the tractor driving mechanism, and said attaching members being slidable relative to said links in another zone to effect separation of the members from the links.

7. The invention set forth in claim 6, wherein releasable locking mechanism is provided in the connection of the upper link to the tractor, and an operating connection is provided between the attaching members and said locking mechanism and effective in the first zone of movement of said members to release said locking mechanism prior to separation of the attaching members from the links.

References Cited in the file of this patent

UNITED STATES PATENTS

| | | |
|---|---|---|
| 1,353,299 | Blumberg | Jan. 11, 1921 |
| 1,652,345 | Brinkman | Dec. 13, 1927 |
| 1,815,794 | Miller | July 21, 1931 |
| 1,936,768 | Morkovski | Nov. 28, 1933 |
| 2,140,504 | Den Besten | Dec. 20, 1938 |
| 2,284,145 | Hansmann | May 26, 1942 |
| 2,430,696 | Acton | Nov. 11, 1947 |
| 2,685,453 | Kuhary et al. | Aug. 3, 1954 |

FOREIGN PATENTS

| | | |
|---|---|---|
| 568,928 | Great Britain | Apr. 26, 1945 |
| 626,922 | Great Britain | July 22, 1949 |